Feb. 8, 1938. G. A. WOOD 2,107,357

VACUUM ACTUATED AUTOMOBILE CONTROL

Original Filed June 16, 1932 5 Sheets-Sheet 1

Inventor
Garfield A. Wood
By Livnance & Van Antwerp
Attorneys

Feb. 8, 1938.  G. A. WOOD  2,107,357

VACUUM ACTUATED AUTOMOBILE CONTROL

Original Filed June 16, 1932  5 Sheets—Sheet 3

Inventor
Garfield A. Wood
By Liverance & Van Antwerp
Attorneys

Feb. 8, 1938.  G. A. WOOD  2,107,357
VACUUM ACTUATED AUTOMOBILE CONTROL
Original Filed June 16, 1932    5 Sheets-Sheet 5

Inventor
Garfield A. Wood

Patented Feb. 8, 1938

2,107,357

UNITED STATES PATENT OFFICE 2,107,357

VACUUM ACTUATED AUTOMOBILE CONTROL

Garfield A. Wood, Detroit, Mich.

Application June 16, 1932, Serial No. 617,561
Renewed July 15, 1937

4 Claims. (Cl. 192—.01)

This invention primarily relates to controls for automobiles of the conventional type having engine accelerator, brake and clutch operating means and the primary purpose of the invention is to provide a single manually operated member, which member is preferably in the form of a foot operated pedal, for the purpose of controlling and actuating all three of said control devices.

Advance in the ease and simplicity of driving an automobile is the principal aim of this invention. It has been common practice to provide three separate independent foot operated pedals or devices to perform the respective functions of accelerating the engine, actuating the clutch and manipulating the brakes, which devices required the use of both feet of the driver and it was necessary to shift one of the feet back and forth between two of the devices to operate them. Ordinarily there has been provided a so-called clutch pedal, a brake pedal and an accelerator pedal or button. The clutch pedal was ordinarily arranged to be operated by the left foot of the driver while the brake pedal and accelerator button were alternately operated by the right foot of the driver who shifted his foot from one to the other as occasion demanded. Such a control arrangement, like many other imperfect devices, has been commonly accepted by automobile users because the automobile could be controlled by it and because there was no better device to be had. However, this common conventional arrangement is highly imperfect in various ways. It requires constant readiness of both feet of the operator. Usually considerable effort was required to operate the devices, especially the clutch and brake pedals which was a tiring operation. Shifting of one foot between two members to operate them as they should be, required considerable skill and many times in emergencies the operator's foot would not immediately find the proper pedal for quick operation and accidents would occur. Individual operation of the independent members required considerable training and skill of the operator and it was only the most skillful drivers who could judge operation of the independent members and manipulate them in their proper sequence to obtain the most perfect and efficient control results.

The present invention provides means to obviate the aforedescribed and many other inefficiencies in previously known means for controlling an automobile. While this invention utilizes an automobile having the customary independent clutch, brake and accelerator devices it provides a single foot pedal by operation of which all three of these devices are automatically operated in their proper order and with the most efficient results. The invention further employs power means for actuation of the clutch and brake pedals which power means is effectively controlled by the said single foot pedal which eliminates the effort of the driver.

By utilizing a power device to actuate the clutch and brake pedals which power device is easily controlled by simple operation of a control pedal which requires no effort to operate, the fatigue of driving is entirely eliminated. Heavy automobiles, such as buses or trucks which require considerable strength or effort to move the clutch and brake pedals may be efficiently handled by mere operation of the control pedal which requires only ounces of pressure to move. The power to operate the power device is obtained from the engine of the automobile in most cases at times when the engine is running idle and not driving the automobile and the power is obtained in such a manner as to detract nothing from the available power for propelling the vehicle and to entail no additional expense in operation. In other words, the power used is that which would otherwise be wasted.

The preferred embodiment of the power means comprises a fluid pressure actuated device deriving its energy from suction produced in the intake manifold of the internal combustion engine of the automobile and this power device provides various new and useful features of construction and arrangement per se.

The invention throughout provides various novel details of construction and arrangement as hereinafter more fully described and particularly pointed out in the claims, reference being had to the accompanying drawings, in which.

Like numbers refer to like parts in all of the figures.

Figure 1:
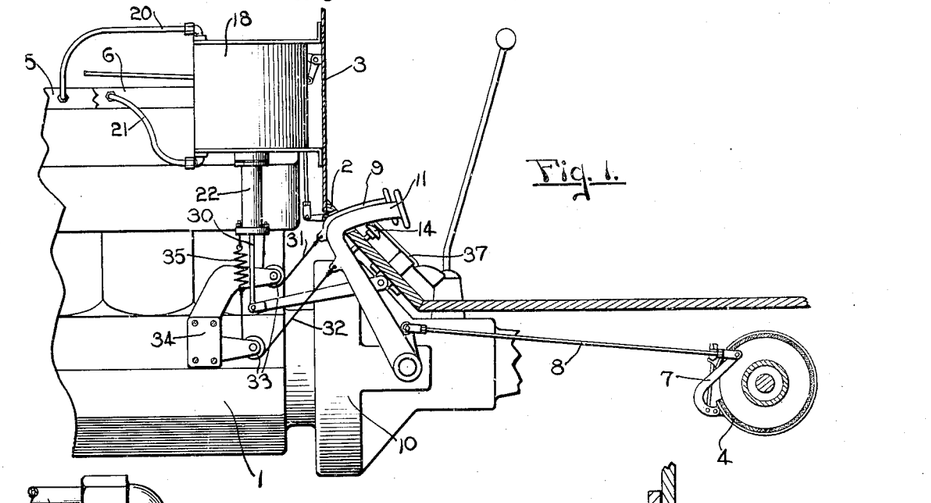
Fig. 1 is a fragmentary elevation, partly in section, of a portion of an automobile showing one form of this invention operatively applied thereto.

As heretofore stated, this invention is adapted to be applied to a conventional automobile which, with particular reference to Fig. 1, includes an engine 1 of the internal combustion type, a foot board 2, a dash 3, and a rear axle having brakes 4 thereon. The engine 1 may be of the type having two intake manifolds 5 and 6 or of a type having only one intake manifold which will be hereafter described. The brake 4 may be of any conventional type, the one illustrated having a lever 7 by which it is operated by means of a brake rod 8 extending to and connected with a brake pedal lever 9, the rod 8 being connected with the lever 9 in any suitable way so that depression of the brake pedal will move the rod 8 to apply the brake 4. A conventional clutch, not shown, is located within the casing 10 and is disengaged by downward movement of the clutch pedal 11 and engaged by upward movement thereof, connection between the clutch pedal 11 and the clutch being made in any suitable conventional manner and not herein specifically illustrated. The clutch serves as a means of connecting or disconnecting the engine with the mechanism which drives the automobile.

Figure 4:
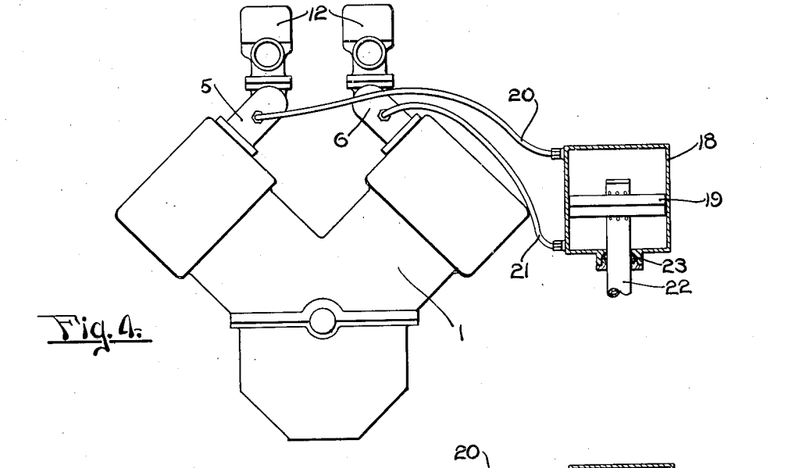
Fig. 4 is a diagrammatic disclosure of the cylinder of the power device connected with an engine having two independent intake manifolds.
Figure 9:
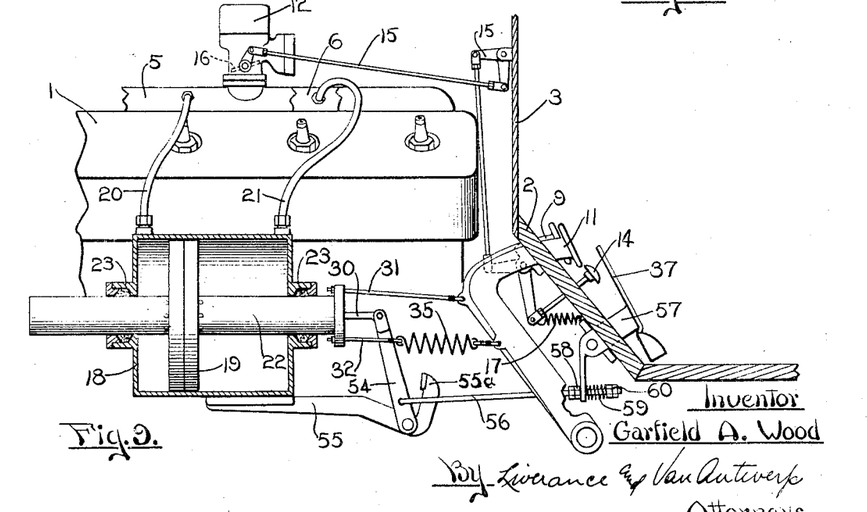
Fig. 9 is a view analogous to Fig. 1 showing a different arrangement of the power and control devices.

The engine is provided with a suitable carburetor 12 which is connected with the inlet manifold of the engine. In some cases where there are two manifolds, two such carburetors are provided, one being connected to each manifold as in Fig. 4 and in other cases there may be only a single manifold such as 13 in Fig. 5. In all cases, whether there be one carburetor or more, there is provided accelerator pedal or button 14, usually protruding upwardly through the foot board 2 of the automobile and being connected by suitable levers and rods 15 to a throttle valve or valves 16 which serves to control the flow of fuel from the carburetor to the inlet manifold. Usually a spring 17, Fig. 9, is provided to move the throttle actuating parts in a direction to close the valve which movement causes the accelerator button 14 to rise and downward movement of the accelerator button 14 against tension of the spring 17 serves to open the throttle valve causing acceleration of the engine.

To operate the brake and clutch pedals 9 and 11 a power device is provided in the form of a cylinder 18 having a reciprocable piston 19 therein. The device may be mounted with its axis vertical by attaching the cylinder to the dash 3 as in Fig. 1 or it may be mounted horizontally as in Fig. 9 with the cylinder suitably fixed. The cylinder 18 is connected at each of its ends by pipes 20 and 21 with a source of vacuum which is created in the intake manifold of the engine. In the form which utilizes an engine having two independent manifolds with two carburetors and throttle valves, which will first be described as the preferred form, the respective pipes 20 and 21 lead to the respective manifolds 5 and 6 and communicate therewith at points between the throttle valves and the engine cylinders.

Figure 2:
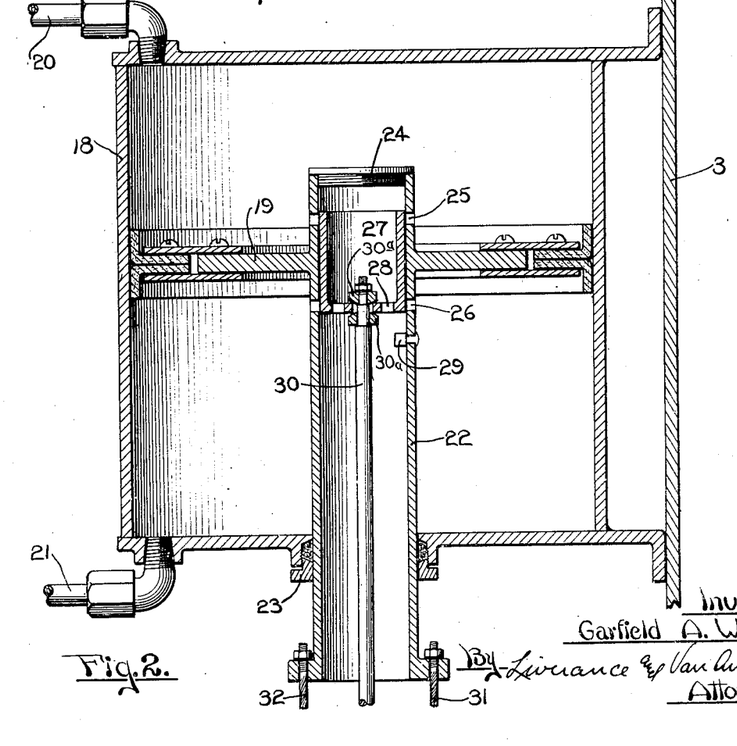
Fig. 2 is an enlarged axial section of one form of the power device embodied in the invention.

In the type of power device illustrated for example in Fig. 2, the piston 19 is provided with a hollow or tubular piston rod 22 which extends through one end and the cylinder is provided with a suitable stuffing box 23. The piston rod 22 is of tubular shape and the end which projects from the cylinder is left open while the opposite end within the cylinder, which extends slightly beyond the surface of the piston 19, is closed by a cap 24. A series of ports 25 and 26 are provided through the walls of the tubular piston rod 22 at opposite sides of the piston 19 which ports provide communication between the interior of the tube 22 and the cylinder 18 at opposite sides of the piston. The ports of each series are preferably of balanced size at opposite sides of the tube so that equal lateral pressure will be exerted on the valve 27 to avoid friction.

A cylindrical slide valve 27 is located within the tube 22 and is of just sufficient length to extend between and cover both series of ports 25 and 26 at the same time. When slid in one direction or the other this valve 27 will open one or the other series of ports 25 and 26. The valve is preferably hollow having one closed end through which extend passages 28 whereby communication through the valve within the tube 22 is provided. Movement of the valve in one direction is limited by the cap 24 and in the other direction by a stop 29 fixed to the wall of the tube 22, each of these stops permitting movement of the valve 27 in either direction to completely uncover one or the other of the series of ports 25 and 26. A valve rod 30 is attached to the valve 27 and extends through the tubular piston rod 22 to the exterior thereof whereat it is connected to manually operate the parts as hereafter described. For proper operation the connection between the valve 27 and the valve rod 30 should have a swinging movement to avoid binding the valve in the tube by a lateral movement of the lower end of the rod 30. This swinging connection may be made in any suitable manner, the structure herein shown having members 30a with curved surfaces in engagement with the valve, said members 30a being fixed to the valve rod 30, so that a universal swinging movement of the rod 30 relative to the valve may occur.

It will be seen that the parts of the power device heretofore described will act in the following manner: Vacuum conditions produced in the intake manifolds of the engine when the engine is operating, and such vacuum conditions will be greatest when the throttle valves are closed, will produce a similar considerable vacuum condition on both sides of the piston 19 within the cylinder 18 but inasmuch as like vacuums exist on both sides of the piston it will be substantially balanced and there will be no effort to move it in either direction so long as like vacuum is maintained on both sides of the piston.

The slide valve 27, when in position to close both sets of ports 25 and 26, serves to maintain like vacuum on both sides of the piston but when the valve is moved in one direction, as for example downwardly, to uncover the ports 25 but to still keep the ports 26 closed, the interior of the cylinder 18 above the piston 19 is opened to atmospheric pressure through the interior of the tubular piston rod 22 permitting air to enter and reducing the vacuum on this side whereby the greater vacuum exerted on the lower side of the piston causes it to move downwardly. If the slide valve 27 is only moved downwardly a small extent and held there then the piston will only move downwardly the same distance that the valve has been moved which will cause the ports 25 to again become covered and close the upper side of the piston against atmospheric pressure whereupon the vacuum conditions on both sides of the piston will again become equal and balanced and the piston will move no farther.

The piston may be caused to move downwardly as far as desired within its range of travel by continued movement of the slide valve 27 and it will continue its downward movement so long as the slide valve is moved to keep the ports 25 uncovered and permit normal air pressure to enter the cylinder above the piston. Because of the stop 29 the valve 27 may not be moved downwardly greatly in advance of the movement of the piston but it may be caused to move downwardly simultaneously with the movement of the piston to any extent desired within the range of movement.

It will be obvious of course that upward movement of the piston is similarly caused by upward movement of the valve 27 to uncover the ports 26. It will thus be understood that the movement of the piston 19 may be very accurately controlled by movement of the slide valve 27 and its movement may be caused to be as great or little as desired in either direction within the limit of its travel. A very slight movement of the valve 27 will uncover either of the series of ports sufficiently to unbalance the pressures on opposite sides of the piston and it has been found that the piston will immediately react to such unbalanced pressures moving instantly to a position where the valve 27 will again close the ports and will stop practically at a point where the ports become covered or closed.

This valve mechanism also serves to maintain the piston 19 stationary, or substantially stationary, when the valve is not moved and when differences in pressure or vacuum exist on opposite sides of the piston because of differences in such pressure or vacuum occurring at the source thereof. For example, when the pipes 20 and 21 lead to different independent sources, or because of obstructions, leaks or other defects, there may be sufficient difference in the pressures on opposite sides of the piston to cause it to move when the valve 27 remains stationary and it is not desired to have movement of the piston; in such cases, the piston will only move a slight distance sufficient to uncover to a small extent, or cause leakage through one of the series of ports 25 or 26 which leakage will serve to counteract the difference in pressure at the source and will cause the pressure at opposite sides of the piston to become balanced, so that it will remain stationary. In this manner the valve serves as an automatic compensator for inadvertent differences in pressure at opposite sides of the piston.

Both the brake pedal 9 and the clutch pedal 11 are connected to the lower projecting end of the piston rod 22 by cables 31 and 32 respectively. These cables pass around pulleys 33 which are mounted on a bracket 34 fixed to some rigid portion of the automobile such as the frame thereof. Usually the brake and clutch pedals are similar in length and movement and each requires approximately the same movement to perform its function but of course, in operation of the automobile it is generally desirable to disengage the clutch before engaging the brake and vice versa.

In the present structure, since both pedals are actuated by the same moving member, namely, the piston rod 22, it becomes desirable to move the two pedals from rest position downwardly at different speeds, the clutch pedal moving faster so that it will disengage the clutch before the brake pedal has reached the position where the brake will become engaged. For this purpose the cable 31 is attached to the brake pedal at a location farther from the pivot than is the attachment of the cable 32 to the clutch pedal resulting, by the different leverages, in faster movement of the clutch pedal. However, since both pedals have substantially the same limit of movement, by this arrangement the clutch pedal will reach its limit while the brake pedal still has movement to be made and to accommodate this condition a spring 35 is inserted in the clutch pedal cable 32 so that after the clutch pedal 11 has reached its limit of downward movement continued movement of the piston rod 22 to farther move the brake pedal 9 will cause elongation of the spring 35. It will be understood that the spring 35 will have sufficient tension to exert the required effort to operate the clutch pedal 11 without appreciable elongation. This arrangement is advantageous in that it provides a greater leverage for the brake pedal which in emergency requires more power for its operation than does the ordinary clutch pedal operation.

Figure 3:
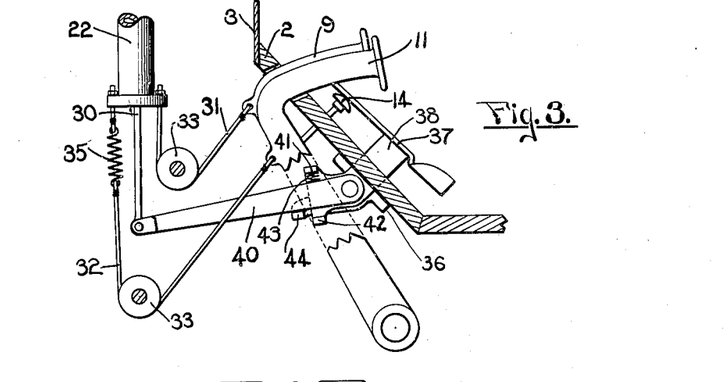
Fig. 3 is a fragmentary enlarged elevation, partly in section with parts broken away showing more clearly details of some of the parts shown in Fig. 1.
Figure 12:
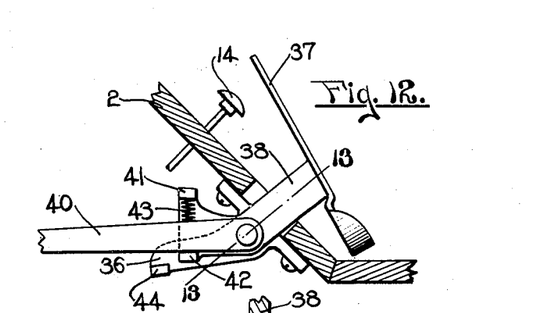
Fig. 12 is an enlarged view with parts broken away, of the foot pedal control and associated parts.
Figure 13:
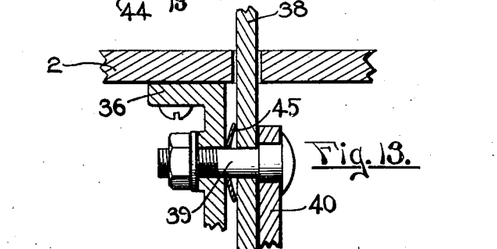
Fig. 13 is a fragmentary section on the line 13—13 of Fig. 12, illustrating the friction retaining feature of the structure.

The slide valve 27 is manipulated to control movement of the piston 19 by a control pedal structure which comprises a bracket 36 attached to the foot board 2 of the automobile, see Figs. 3, 12 and 13. The control pedal 37 is located above the foot board 2 and is mounted on a pedal lever 38 which is pivoted by a bolt 39 to the bracket 36. A control lever 40 is also pivotally mounted adjacent the pedal lever 38 on the same pivot bolt 39 and the swinging end of the lever 40 is connected to the lower projecting end of the valve rod 30. The control lever 40 extends between two lugs 41 and 42 which are formed as integral parts of the pedal lever 38 and a spring 43 interposed between the lever 40 and the upper lug 41 yieldably thrusts the lever against the lower lug 42.

An extension of the bracket 36 carries a stop lug 44 located in the path of the control lever 40 and limits the downward movement of the said lever. A spring washer 45 surrounds the pivot bolt 49 and is interposed between the bracket 36 and the pedal lever 38 to exert a frictional resistance to movement of the said pedal lever but the bolt 39 is shouldered at the portion which carries the control lever 40 so that said frictional resistance is not imposed upon movement of the control lever 40.

In the forms shown in Figs. 3, 9 and 12, which will be first explained, the control pedal 37 is located in a position where the forward part of its under surface will engage the accelerator button 14. Adjustment of the pedal and its associated parts is arranged so that the upper portion of its movement will occur out of engagement with the accelerator button while the lower part of its movement will occur while in engagement with said button and will result in also moving said button. Since the accelerator button 14 is the means by which the engine speed and power is controlled it will be evident that the upper range of movement of the control pedal 37 may occur without having any effect upon the engine's operation while the lower range of movement of the pedal will accelerate or decelerate the engine speed.

The control pedal 37 serves to control operation of the piston 19 of the power device which in turn operates the brake and clutch pedals 9 and 11 and the control pedal 37 also operates the accelerator button 14 which in turn controls the speed of the engine. It is preferred that the entire range of movement of the pedal 37 which is required to control movement of the piston 19 within its entire range of travel shall occur in that part of movement of the pedal 37 where it is out of contact with the accelerator button 14 and that movement of the pedal 37 in its lower range where it is in contact with, and moves the accelerator button shall have no effect to move the piston 19.

To accomplish this action the upper movement of the pedal 37 moves the control lever 40 above the stop lug 44 and the lever 40 is caused to move with the pedal lever 38 by its engagement with the lower lug 42 and action of the spring 43 which spring exerts sufficient effort to move the parts to which the swinging ends of the lever 40 is connected. The parts are preferably arranged so that approximately at the location where the underside of the pedal 37 comes into engagement with the accelerator button 14 the control lever 40 will also engage the stop lug 44. The stop lug 44 prevents further downward movement of the control lever 40 and when the control pedal 37 is moved downwardly past the said location the spring 43 will yield permitting the lug 42 to move away from the lower edge of the control lever 40 and therefore permitting downward movement of the control pedal 37 without corresponding movement of the control lever 40.

Figures 14, 15, 16, 17, 18:
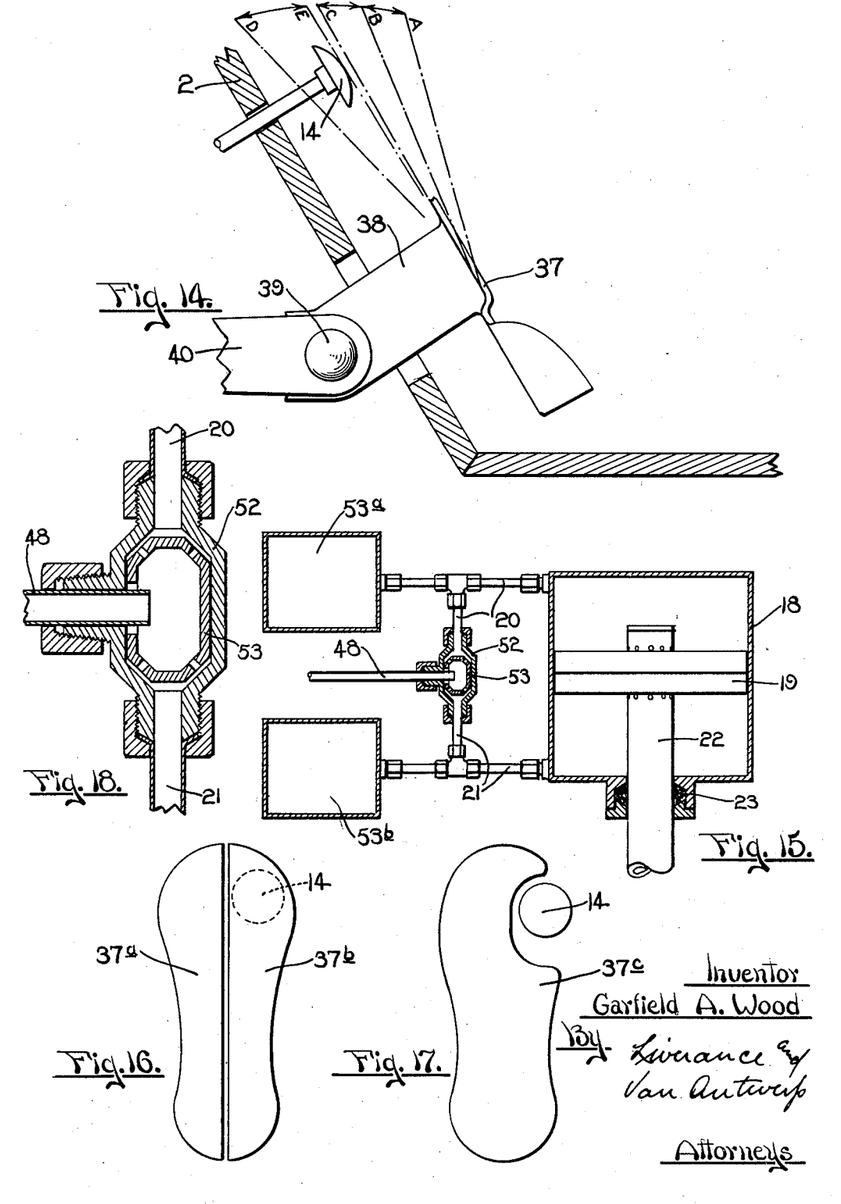
Fig. 14 is a diagram illustrating the various positions of the control foot pedal and indicating the respective actions occurring in the different positions.
Fig. 15 is a diagram illustrating a modification of the structure used in connecting the power device with a single manifold of an engine.
Figs. 16 and 17 are plan views of the control foot pedal showing two different modifications thereof.
Fig. 18 is an enlarged sectional view of the valve used in the structure of Fig. 15.

Fig. 14 illustrates the movement and positions of the control pedal 37 to accomplish various results. The range of movement of the pedal between positions A and C represents operation of the parts to effect a complete stroke of the piston 19 within its entire range. With the pedal in the position A the piston is at its extreme upper limit and pulls both brake and clutch pedals 9 and 11 downward to their extreme limits. At position C the piston is at its extreme lower position and has completely released the clutch and brake pedals permitting them to assume their extreme upper positions. At position C the control lever 40 engages the stop lug 44 so that downward movement of the pedal from position C to position D does not move the control lever 40 and therefore has no effect upon the slide valve 27 and the piston 19. The specific operation of the structure heretofore described will be later explained.

With reference to the power device per se and the various modifications thereof which are disclosed by the drawings it is to be understood that primarily the power device may be described as fluid pressure operated and so far as its essentials are concerned it will operate effectively under application of any fluid pressure. However, this invention has particularly conceived a power device as adapted to be operated by a negative fluid pressure which is the vacuum condition established in the intake manifold of the engine.

In the form shown in Figs. 1, 2, 4 and 9 it is intended that the vacuum for the cylinder 18 at opposite sides of the piston 19 be respectively derived from separate intake manifolds 5 and 6 of the engine. In this arrangement each side of the piston is acted upon by an independent source of vacuum and admission of air into the cylinder at one side of the piston will not interfere with the vacuum condition existing on the opposite side of the piston.

Because of the fact that pressures obtainable by vacuum are relatively small it is necessary to use a relatively large diameter cylinder and piston to produce the power required to operate the parts, especially the brake lever which in emergencies requires considerable pressure for its effective operation. The necessarily large piston displaces a considerable volume in its movement and it is not desirable to use connecting pipes 20 and 21 leading to the intake manifold of sufficient size to pass the volume displaced by the piston in its movement. Furthermore, it is questionable whether the ordinary automobile engine would produce in its intake manifold the volume of vacuum at the speed it is displaced by movement of the piston 19. Therefore, movement of the piston 19 by action of unbalanced pressures on its opposite sides is produced by the volume of the vacuum existing in the cylinder. For example, in such a structure as illustrated in Fig. 2, the cylinder is somewhat longer than the stroke of the piston so that if the piston be located at one extreme end of its movement the volume of vacuum within the cylinder is sufficient to move it to the other extreme end of its stroke when air is admitted to one side of the piston such movement being aided by additional vacuum created to a small extent through one of the relatively small supply pipes 20 or 21.

Figure 11:
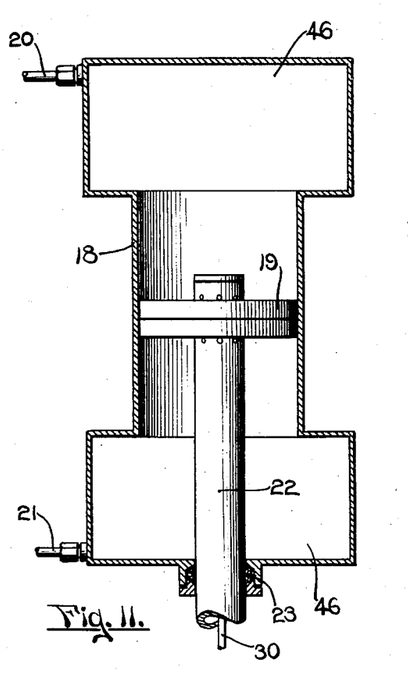

Fig. 11 illustrates a structure in which the volume or capacity of the cylinder 18 is accentuated and greatly increased by enlargements 46 at opposite ends of the cylinder 18 in direct communication therewith. In such a structure, as well as in the structure of Fig. 2, vacuum is created in the cylinder at opposite sides of the piston 19 while the piston is idle and is stored in the capacity of the cylinder for instantaneous use in relatively large volume when it is desired to move the piston.

Figure 5:
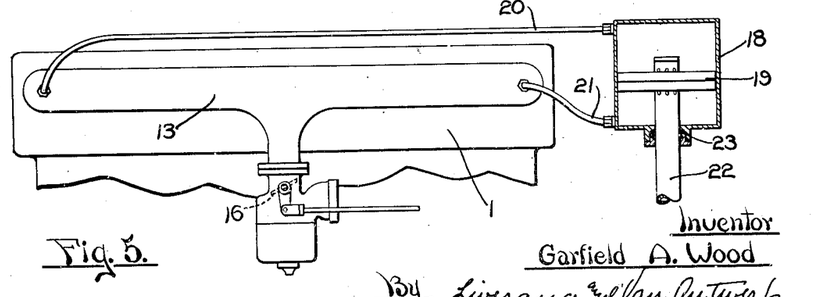
Fig. 5 is a diagram illustrating one manner of connecting the cylinder of the power device with an engine having a single intake manifold.

In structures where both ends of the cylinder 18 derive their vacuum from the same source, such as an engine having a single inlet manifold, it is preferable to provide means to prevent admission of air to the cylinder at one side of the piston 19 from being transferred to the cylinder at the opposite side of the piston to disturb the vacuum condition in that opposite side. Various means for this purpose have been conceived one of which is illustrated in Fig. 5 wherein the pipes 20 and 21 communicating with opposite ends of the cylinder are led to extreme ends or spaced apart locations of the inlet manifold 13. With the multiple cylinder engines commonly used in automobiles at this time it will be understood that in producing a vacuum in the inlet manifold there are several cylinders each producing a suction in the manifold at locations distributed throughout the length of the manifold.

Each cylinder on its suction stroke will create an instantaneous suction at its particular location in the manifold and, although the vacuum condition is more or less evenly distributed throughout the whole manifold there are unquestionably times during the suction stroke of the respective pistons in the cylinders of the engine when the vacuum is greater in some locations than in others and by widely separating the points at which the pipes 20 and 21 communicate with the manifold each pipe to some extent is made to have its own independent source of vacuum. For example, if air is admitted to the cylinder 18 below the piston this air will travel through the pipe 21 into one end of the manifold 13 but will be largely absorbed or sucked into the various cylinders of the engine located between that end and the opposite end of the manifold so that the vacuum condition at the opposite end of the manifold where the pipe 20 communicates will be largely undisturbed. This action is aided by the fact that the pipes 20 and 21 are of relatively small capacity and that air admitted to the cylinder cannot pass in large quantities into the manifold to disturb the vacuum condition therein.

Figure 6:
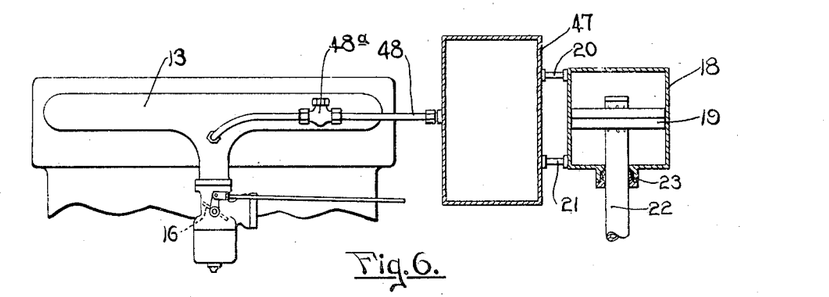
Fig. 6 is a diagram illustrating a modified manner of connecting the power device with a single manifold of an engine.

Fig. 6 illustrates diagrammatically another structure adapted to operate with a single manifold engine. In this structure a tank or chamber 47, having considerable capacity, is connected by a single pipe 48 to the inlet manifold 13 and the opposite ends of the cylinder 18 communicate with the chamber 47 by means of pipes 20 and 21 of restricted size. With this structure the chamber 47 has a large vacuum capacity which is maintained or rebuilt by the engine suction through the pipe 48 and when air is admitted to one end of the cylinder 18 passage of air into the chamber 47 is restricted because of the small size of the pipes 20 and 21 and such air as is transferred into the chamber 47 is largely absorbed in the large vacuum capacity therein so that very little change of vacuum at the opposite end of the cylinder 18 occurs, thus permitting the vacuum in said opposite end of the cylinder to perform its function of moving the piston 19.

A check valve 48a may be inserted in the pipe 48 acting to prevent flow of gas in a direction toward the chamber 47. This check valve will serve to retain vacuum in the chamber 47 when the degree of vacuum at the source is less than in the chamber as when the engine stops and it is desired to operate the device with the vacuum previously established.

Figure 7:
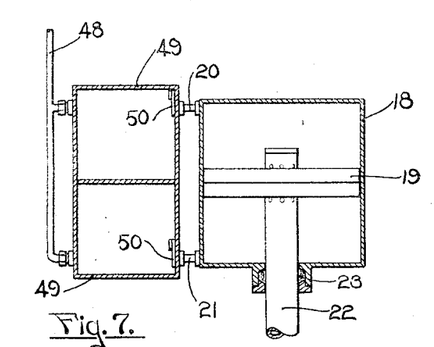
Figs. 7 and 8 are diagrams illustrating other modified structures for use in operating the power device with a single manifold of an engine.

Fig. 7 illustrates a structure having a single pipe 48 leading to a single engine manifold and a divided capacity chamber 49, the pipe 48 being branched to lead to both chambers of the tank 49. Opposite ends of the cylinder 18 communicate by pipes 20 and 21 with opposite chambers of the tank 49 and check valves or flap valves 50 are provided to permit passage of air only in a direction out of the cylinder 18 into the chambers 49. With this arrangement air admitted to one end of the cylinder 18, the lower end for example, may pass in a limited quantity through the pipe 21 into the lower chamber 49 and will reduce the degree of vacuum in that chamber and this change in vacuum condition will be slowly transferred through the pipe 48, which is of restricted size, to the upper chamber 49 but the flap valve 50 at the entrance of the pipe 20 will not permit air to enter the upper end of the cylinder to reduce the vacuum existing therein.

Figure 8:
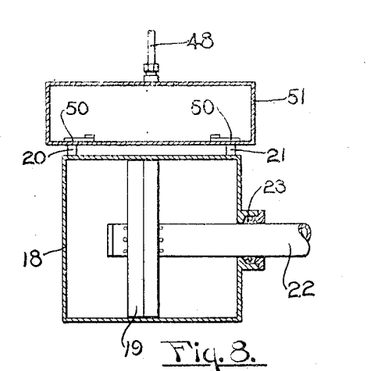

Fig. 8 illustrates a structure analogous to that shown in Fig. 7 excepting that the capacity chamber 51 is not divided and both pipes 20 and 21 communicate with the same chamber although the same flap valves 50 are used to prevent entrance of air into the cylinder 18.

Fig. 15 utilizes an equalizing valve similar to that shown in the present pending patent application of E. R. Barrett, Serial No. 519,402, filed March 2, 1931, for the purpose of preventing bypassing of air admitted to one end of the cylinder 18 through the suction pipes to the opposite end of the cylinder. This valve comprises a case 52 having a sliding hollow valve 53 therein. The case 52 communicates at its respective ends with the pipes 20 and 21 leading to opposite ends of the cylinder 18 and between its ends the pipe 48 leading to the inlet manifold 13 is inserted in a manner to communicate with the interior of the hollow valve 53. The hollow valve 53 has openings through its respective ends in positions to be closed by engagement with either end of the case 52 when the valve is moved in either direction. When the valve is in mid-position with neither of its ends in engagement with the case the openings through the ends of the valves are unobstructed and air may pass through them from the interior of the case 52 to the interior of the valve 53 and thence to the pipe 48.

In this structure, when the piston 19 is balanced and the pressure at both sides of the cylinder 18 is the same, suction through the pipe 48 will balance the valve 53 and air may pass through both of the pipes 20 and 21 from both ends of the cylinder 18. However, when air is admitted, for example, to the lower end of the cylinder 18 the pressure in the pipe 21 communicating with one end of the case 52 will be increased and because of the lesser pressure at the opposite end of the case 52 adjacent the communication with the pipe 20 the valve 53 will move to that end of the case closing the openings at that end of the valve 53 and preventing the increased pressure being transmitted through the pipe 20 to the opposite end of the cylinder 18.

The arrangement of Fig. 15 may also include chambers 53a and 53b in communication respectively with the pipes 20 and 21 at opposite sides of the valve, which chambers serve both to store a reserve supply of vacuum and to absorb pressure which may be admitted to the cylinder 18. For example, if pressure is admitted to the lower side of the cylinder it will communicate through the pipe 21 to move the valve 53 as described and will also enter the chamber 53b to be absorbed by the vacuum established therein and at the same time the upper side of the cylinder will be cut off by said valve from the air pressure admitted and the vacuum previously established in the chamber 53a will aid the vacuum in the upper end of the cylinder to raise the piston.

Figure 10:
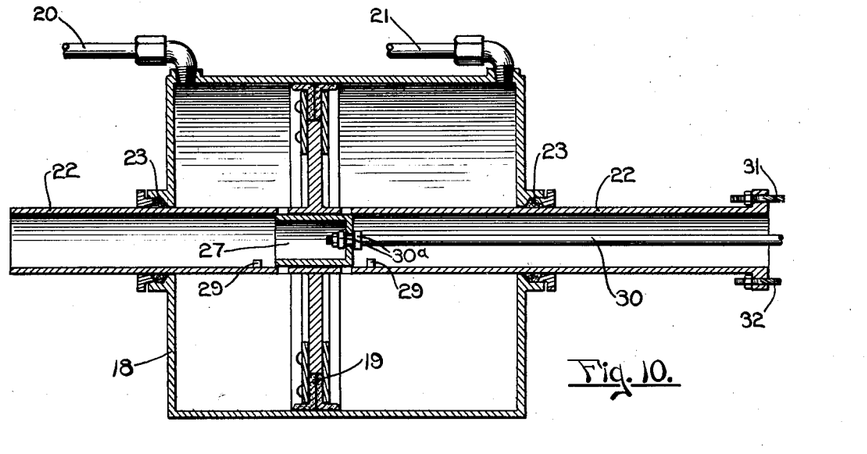
Figs. 10 and 11 are axial sections illustrating modifications of the details of structure of the power device.

Fig. 10 illustrates a somewhat altered form of cylinder and tubular piston rod arrangement than illustrated for example in Fig. 2. The structure shown in Fig. 2 is not one in which the piston is exactly balanced by equal pressures at its opposite sides because of the displacement of the tubular piston rod 22 which passes through one end of the cylinder and thereby reduces the effective pressure area of the piston. While the structure identical with that shown in Fig. 2 has been used and found to be fully operative there must of course be a slightly greater suction effort at the upper side of the piston than at the lower side, this difference being the area of the cross section of the tubular piston rod 22 times the vacuum effort exerted in the cylinder. When the device is used in a vertical position as shown in Fig. 2 it is probable that this difference will approximate the weight of the piston, piston rod and parts supported thereby so that the added suction effort tending to raise the piston will approximately offset the weight of the parts tending to lower the piston.

However it may be preferred in some cases to utilize a structure in which the piston will be perfectly balanced when equal pressures or vacuum conditions exist at its opposite sides and for such purpose the structure shown in Fig. 10 is provided. In this structure the tubular piston rod 22 extends completely through the cylinder 18 and through both ends of the cylinder, being provided with suitable stuffing boxes 23 at each end of the cylinder. In this arrangement both ends of the piston rod 22 may be left open to the atmosphere making it unnecessary to provide an air passage through the slide valve 27 since air may enter through either end of the piston rod when ports 25 or 26 are opened by movement of the slide valve 27 in either direction. In this structure it is desirable to provide a stop 29 at each side of the slide valve 27 to limit movement of the slide valve relative to the piston rod in both directions, the cap 24 having served as an upward limit stop in the structure of Fig. 2. In this construction the effective pressure area at both sides of the piston 19 are exactly the same and the cylinder may be used with its axis in a horizontal position where the weight of the moving parts does not have a tendency to move the piston and therefore no counteracting force is needed to support the weight of the moving parts.

Fig. 9 illustrates a complete assembly of a horizontally arranged cylinder connected with the operating parts of an automobile and illustrates certain modified details of control parts. In this structure the brake and clutch pedals 9 and 11 are both connected to the piston rod 22 by cables or rods 31 and 32 and a pedal 37 arranged to engage the accelerator button 14 the same as heretofore described. However the connections between the pedal 37 and the valve rod 30 are of somewhat different nature.

A control lever 54 is pivoted to a fixed bracket 55 and has its swinging end connected to the valve rod 30 and a connecting rod 56 is connected to the control lever 54 between its ends and passed through the lower end of a pedal lever 57. A stop nut 58 is located on the connecting rod 56 to engage one side of the pedal lever and a spring 59 is interposed between the opposite side of the lever 57 and a nut 60 on the rod 56 spaced from the lever 57. By this arrangement the pedal 37 may be rocked downwardly the first part of its movement and the rod 56 will be pulled by tension of the spring 59 to move the control lever 54 thus moving the slide valve 27 to cause the piston 19 to move in a direction to release the brake and clutch pedals 11 and at the limit of the movements of these parts, when the control lever 54 engages the stop 55a, the pedal 37 may be moved downward further to actuate the accelerator button 14 which movement will result in compression of the spring 59 without further movement of the parts of the power device.

In the structure of the control pedal 37 heretofore described, operation of the said pedal in its lower range of movement necessitated corresponding movement of the accelerator button 14 and it would be impossible to operate the accelerator button 14 without operation of the control pedal. It has been conceived that independent and selective operation of these two devices may be desirable under certain conditions and the structure illustrated in Fig. 16 is designed to accomplish such independent operation. The pedal shown in Fig. 16 consists of two longitudinally divided halves 37a and 37b, both preferably pivoted on the same axis. The half pedal 37a has the same structure for operating the slide valve 27 as illustrated in sectional elevation in Fig. 12 but its forward portion is arranged out of alinement with the accelerator button 14 so that it will not engage it when rocked. The pedal half 37b is merely arranged to pivot or rock freely upon the same axis as the pedal half 37a but has no parts connected to operate the slide valve 27. The two pedal halves are entirely independent of each other and can be independently moved and the pedal half 37b is arranged so that its forward portion will engage the accelerator button 14 when depressed.

With the pedal structure illustrated in Fig. 16 the operator may, if he desires, obtain the same result as with the pedal 37 illustrated in Fig. 12 by placing his foot in position to simultaneously engage both halves of the pedal so that they will be moved together and when so operated and moved in unison they function as a single pedal. However either of the pedal halves may be operated independently of the other by simply moving the foot to engage only the half which it is desired to operate. The functions and advantages of such a structure will be hereafter described.

The pedal arrangement shown by Fig. 17 is analogous to that of Fig. 16 in function and operation and it comprises a control pedal 37c identical in all respects with the pedal 37 of Fig. 12 excepting that an aperture is provided at the toe of the pedal in a location alined with the accelerator button 14 so that the pedal in its movement cannot engage or operate the accelerator button. With this structure the operator may obtain the same control as with the structure of Fig. 12 by locating his foot in position to cover the aperture in the pedal and to engage the accelerator button when the toe of the pedal is depressed in which case the accelerator button 14 is actuated by engagement with the sole of the shoe of the operator the same as it is actuated in the structure of Fig. 12 by engagement with the underside of the pedal 37. However, if the operator desires to actuate the clutch and brake only with the pedal 37 he may shift the toe of his foot sideways to a position where the accelerator button 14 will not be engaged upon depression of the pedal 37c. The advantages of this structure will also be hereafter described.

*Operation*

Explaining first the operation of the structure shown in Figs. 1, 2, 3, 12, 13, 14, etc., it will be assumed that the parts are in position to cause the clutch to be released, the brake applied and the motor decelerated. In this position, referring to Fig. 14, the pedal 37 will be located somewhere in a range between positions A and B which will result in causing the piston 19 to be moved to some location near the upper part of its stroke which will pull both the brake and clutch pedals 9 and 11 down, the clutch pedal being pulled down to its limit to fully disengage the clutch and the brake pedal being pulled down sufficiently to apply the brakes with the desired force.

After first having thrown the proper gears of the customary transmission mechanism into mesh in conventional manner, the operator then depresses the toe portion of the pedal 37 and in so doing causes the slide valve 27 to be lowered followed by downward movement of the piston 19 and this downward movement of the piston permits both the brake and clutch pedals to rise, the brake pedal rising first while the spring 35 in the clutch pedal cable 32 contracts and then the clutch pedal also moves upwardly. These movements in the sequence described first release the brakes and then cause the clutch to become engaged so that the engine is connected to move the automobile.

The parts are to be adjusted so that the clutch becomes engaged at position C of the pedal 37 which is just before engagement of the pedal with the accelerator button in the downward movement. The driver continues to move the toe of the pedal downwardly from position C engaging the accelerator button and depressing it to the desired extent and thus causing acceleration of the engine speed.

Usually the operator will move the pedal from position C downwardly beyond position D quite rapidly so that some engine acceleration occurs immediately following engagement of the clutch to avoid possible "stalling" or stopping the engine when it assumes the load of moving the automobile. Engine acceleration prior to full clutch engagement may be caused to occur by extremely rapid motion of the pedal from a position between B and C to a position between C and D. If the pedal is moved with sufficient speed the piston 19 will not have a correspondingly rapid speed and the valve 27 will strike the stop 29 retarding movement of said valve and making it correspond with movement of the piston and this lag in movement of the piston and valve will retard movement of the control lever 40. Under these conditions the pedal will move more rapidly than the lever 40 thus compressing the spring 43 and when so operated the pedal will be caused to engage and depress the accelerator button 14 before the piston 19 has moved sufficiently to cause full clutch engagement with the result that the engine's speed and power will be increased prior to clutch engagement.

At position C of the control pedal both the brake and clutch pedals have been fully released so that further downward movement of the piston 19 would have no effect upon them and therefore it is not desired that the piston shall move downwardly beyond such fully released point and for that purpose the control lever 40 is caused to engage the stop lug 44 at position C of the control pedal so that it will move no farther, and consequently will not cause the piston 19 to move farther, with further movement of the control pedal. Therefore, movement of the control pedal between positions C and D has the effect only of operating the acceleration range and the speed of the engine may be fully controlled within its range by rocking of the pedal between positions C and D.

When it is desired to shift gears which means that the engine shall be decelerated and the clutch disengaged but no application of the brakes should occur, the operator rocks the pedal upwardly to a position between C and B which first causes the pedal to disengage the accelerator button and to then cause the piston 19 to move upwardly sufficiently to pull the clutch pedal down to a point where the clutch will be disengaged. Although the brake pedal is also moved downwardly by the same piston movement it has not moved as fast nor as far and has not reached a position to apply the brakes. When the parts are moved to this position the gears are shifted in the usual manner and the pedal is again moved downwardly to first cause the clutch to become engaged and then the engine to accelerate. The automobile is then driven at varied speeds as may be desired with the clutch in engagement by moving the pedal in the acceleration range.

If desired, the parts may be adjusted so that there is a slight difference between the pedal positions C and E, C being the position in which the clutch is fully engaged and E being the position at which the pedal engages the accelerator button. If desired, with the parts so adjusted, the operator may move the pedal to a position either exactly at E or between E and C in which the clutch will remain engaged and the engine will be fully decelerated. Such a position of the parts is useful when it is desired to leave the clutch in engagement so that the lag of the engine when decelerated will aid in retarding the speed of the automobile which is often desirable to aid the brakes which may be applied at the same time by application of one of the feet of the operator to the brake pedal 9 to depress it.

A coasting condition of the automobile commonly known as "free wheeling" may be attained by moving the pedal to a position between C and B which decelerates the engine and releases the clutch but does not apply the brakes. Under these conditions the automobile will move of its own momentum without being connected to the engine and without being slowed by application of the brakes.

The friction washer 45 may exert sufficient tension to retain the pedal 37 in any position to which it is moved and this feature of the construction may be utilized first to permit the driver to remove his foot entirely from the control pedal in conditions where he may desire to have the pedal depressed to a position where the engine is accelerated and the automobile may be driven at a constant speed for a considerable time. This friction device is also useful when the pedal is placed in position between C and E as just described which decelerates the engine but leaves the clutch engaged and the operator may then remove his foot from the pedal and place it upon the brake pedal 9 to manually operate the brakes aided by lag of the engine.

When it is desired to stop the automobile or slow its travel without aid of the lag of the engine through the clutch and driving connections, the pedal is moved upwardly to position B which first fully releases the accelerator button and then causes movement of the piston 19 sufficient to pull the clutch pedal 11 downwardly to a point where the clutch is disengaged and to also pull the brake pedal downwardly to a point where slight application of the brake occurs. From that point the pedal may be moved between positions B and A to cause the piston 19 to exert the desired braking pressure. If, after the brakes have been applied, it is desired to resume the speed of the automobile without shifting gears the pedal is merely depressed again first passing position C in which the clutch becomes engaged and then entering the acceleration range where the accelerator button is depressed to the desired extent.

It will be understood that braking pressure is maintained by the constant vacuum pull on the upper side of the piston 19. The valve 27 acts under certain conditions to cause the piston 19 to move to a position where the valve will cover both series of ports 25 and 26 to cause a balanced pressure at both sides of the piston and stop movement of the piston thereby. This action occurs where the parts connected to the piston will permit movement thereof sufficiently to cause the ports 25 and 26 to become covered. However, when the parts connected to the piston, such as the brake lever when full braking effort is applied, will not permit movement of the piston sufficiently to cover the ports, then the unbalanced pressure condition at opposite sides of the piston is maintained and the greater suction at one side of the piston continues to exert force thereon. Therefore, when full braking effort is desired to be maintained the valve 27 is moved upwardly beyond the point that the piston can move, because of its connection with the brake pedal and the limited movement of said pedal, and the ports 26 will remain uncovered permitting atmospheric pressure to continue to enter the cylinder below the piston while suction from the engine manifold continues to exert an upward pulling force above the piston.

When using the divided control pedal of Fig. 16, if the operator places his foot upon both of the halves 37a and 37b the operation will be exactly the same as heretofore described for control pedal 37. However, if for any reason the operator should desire to operate the car in conventional manner he may place the pedal half 37a in position anywhere below position C of Fig. 14 which will fully release both the brake and clutch pedals and he may then operate only pedal half 37b which acts only upon the accelerator and he may then manually operate the clutch and brake pedals with his feet in the usual way. On the other hand he may while driving, release pedal half 37b which will serve to decelerate the engine and he may then quickly throw the half 37a to some position between C and D without carefully choosing its exact location which will cause the clutch to be engaged with the engine decelerated and he may then place his foot upon the brake pedal to manually operate it to stop the car aided by lag of the engine.

The operation of the control pedal of Fig. 17 is similar to that of the pedal shown in Fig. 16 excepting that independent operation of the accelerator button cannot conveniently be had. In other words the driver may shift his foot to a position to release the accelerator to cause the engine to decelerate and then move the pedal 37b downwardly to some position where the clutch will be engaged and remove his foot if desired to apply the brake pedal but with this control pedal structure actuation of the accelerator button must be accomplished by power operation of the brake and clutch pedals.

While there is some small difference between the operations of the control pedals of Figs. 12, 16 and 17 they each act in their respective ways in the same manner upon the various modifications of power devices illustrated and likewise each of the respective power devices is controlled in the same way by any of the forms of control pedal structures.

As heretofore stated, it is evident that the power device per se embodied in this invention is valuable in itself without respect to its use as a part of an automobile control mechanism. For any purpose where perfect control of a piston actuated within a cylinder by a fluid pressure medium is desired this power device may be effectively used. The movement of the piston within the cylinder is fully under control within its entire range and in either direction by operation of the slide valve 27 and the valve rod 30.

With respect to the power device itself it is to be understood that, although it has been described as having the piston caused to remain stationary by equal pressures or subatmospheric pressures at both sides of the piston and the piston caused to move by unequal pressures at its opposite sides, it is to be understood that the terms "equal", "unequal", etc., are to be considered as approximate. Actually the frictional resistance to movement of the parts requires a considerable difference in pressures at opposite sides of the piston to cause it to move and therefore a slight difference in vacuum conditions or pressures at opposite sides of the piston may be considered to come within the scope of the term "equal".

I claim:

1. The combination with an automobile having a clutch operator and an engine accelerator, of a power device connected to actuate said clutch operator, means to control actuation of said power device, a pedal arranged to actuate said engine accelerator, connections between said pedal and said control means whereby movement of said pedal actuates said control means, and yieldable means associated with said connections arranged to permit movement of said pedal without actuation of said control means.

2. The combination with an automobile having a clutch operator, brake operator and an engine accelerator of a fluid pressure power device including a cylinder and a piston, means connecting both said clutch operator and said brake operator to be operated by movement of the piston of the power device, means for controlling the pressures of fluid in said cylinder on both sides of the piston in a manner to cause said piston to move in either direction from any location in the cylinder and to cause such movement to continue for any distance within the range of the piston travel, a control pedal connected to actuate said control means, said control pedal also serving to actuate said engine accelerator.

3. The combination with an automobile having a clutch operator and an engine accelerator, of a power device connected to actuate said clutch operator, means to control the actuation of the power device, a pivotally mounted pedal arranged to actuate said accelerator, a movable member connected to said control means, and a spring associated with said pedal and said movable member and serving to actuate said movable member by movement of said pedal, said spring being of sufficient tension to actuate said movable member under normal conditions without appreciable yielding and yieldable under abnormal operation of said pedal.

4. A fluid pressure device including, a cylinder and a piston, means for attaining an equal fluid pressure in the cylinder at both sides of the piston, control means manually operable serving to cause unequal fluid pressures at opposite sides of the piston, said control means being automatically actuated by movement of the piston to cause re-attainment of equal fluid pressures at both sides of the piston, said above elements being combined with an automobile having a clutch operator, brake operator and an engine accelerator, operating connections between said piston and both of said brake and clutch operators, and a control pedal operatively connected to said manually operable control means, said control pedal also serving to actuate said engine accelerator.

GARFIELD A. WOOD.